(12) United States Patent
Fallon et al.

(10) Patent No.: US 9,954,720 B2
(45) Date of Patent: Apr. 24, 2018

(54) METHOD AND APPARATUS FOR DETERMINING AN EVENT INSTANCE

(75) Inventors: Liam Fallon, Athlone (IE); Sajeevan Achuthan, Athlone (IE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 945 days.

(21) Appl. No.: 14/239,472

(22) PCT Filed: Jul. 4, 2012

(86) PCT No.: PCT/EP2012/063040
§ 371 (c)(1),
(2), (4) Date: Jun. 16, 2014

(87) PCT Pub. No.: WO2013/023837
PCT Pub. Date: Feb. 21, 2013

(65) Prior Publication Data
US 2014/0328189 A1    Nov. 6, 2014

Related U.S. Application Data

(60) Provisional application No. 61/524,958, filed on Aug. 18, 2011.

(51) Int. Cl.
*H04L 12/24* (2006.01)
*H04L 12/26* (2006.01)
*H04L 29/08* (2006.01)

(52) U.S. Cl.
CPC ........ *H04L 41/0266* (2013.01); *H04L 41/069* (2013.01); *H04L 41/0686* (2013.01); *H04L 43/06* (2013.01); *H04L 67/2804* (2013.01)

(58) Field of Classification Search
CPC ............. H04L 41/0266; H04L 41/0686; H04L 41/069; H04L 67/2804; H04L 43/06
See application file for complete search history.

(56) References Cited

U.S. PATENT DOCUMENTS

| 8,442,947 B2 | 5/2013 | Veres et al. |
| 2002/0170035 A1 * | 11/2002 | Casati ............... G06F 9/542 717/127 |

(Continued)

FOREIGN PATENT DOCUMENTS

| CN | 101366018 A | 2/2009 |
| CN | 101719879 A | 6/2010 |
| WO | 2008121062 A1 | 10/2008 |

OTHER PUBLICATIONS

First Chinese Office Action dated Jun. 1, 2016, issued in Chinese Patent Application No. 201280051412.7, 22 pages.

(Continued)

*Primary Examiner* — Jenee Holland
(74) *Attorney, Agent, or Firm* — Rothwell, Figg, Ernst & Manbeck, P.C.

(57) ABSTRACT

A method of determining an event instance in an event driven communications system, the method comprising the steps of: receiving (205, 207) an event stream, the event stream comprising a plurality of events; retrieving (203) metadata for each event of the received event stream; instantiating (219) an event instance for each event of the received event stream based on the retrieved metadata; reading (221) event data of each event of the received event stream into the instantiated event instance.

22 Claims, 12 Drawing Sheets

(56) References Cited

U.S. PATENT DOCUMENTS

| | | | | |
|---|---|---|---|---|
| 2003/0105654 | A1* | 6/2003 | MacLeod | G06Q 10/10 709/223 |
| 2003/0154090 | A1* | 8/2003 | Bernstein | G06Q 10/109 705/344 |
| 2004/0143659 | A1* | 7/2004 | Milliken | H04L 29/06 709/224 |
| 2004/0153693 | A1* | 8/2004 | Fisher | G06F 11/0709 714/4.2 |
| 2006/0095332 | A1* | 5/2006 | Riemann | G06F 17/3056 705/22 |
| 2006/0225051 | A1* | 10/2006 | Kannan | G06F 9/542 717/129 |
| 2007/0150585 | A1 | 6/2007 | Chkodrov | |
| 2007/0168971 | A1* | 7/2007 | Royzen | G06F 11/3688 717/124 |
| 2008/0102756 | A1* | 5/2008 | Lehtinen | G01S 5/00 455/67.11 |
| 2008/0104212 | A1* | 5/2008 | Ebrom | D06F 39/005 709/222 |
| 2008/0188963 | A1* | 8/2008 | McCoy | G06F 9/54 700/90 |
| 2009/0044201 | A1* | 2/2009 | Lee | G06F 9/542 719/318 |
| 2010/0287566 | A1* | 11/2010 | Hauser | G06F 9/542 719/318 |
| 2011/0022618 | A1* | 1/2011 | Thatte | G06F 17/30516 707/769 |
| 2011/0023055 | A1* | 1/2011 | Thatte | G06F 9/541 719/328 |
| 2011/0161513 | A1* | 6/2011 | Viers | H04L 12/2697 709/231 |
| 2011/0191784 | A1* | 8/2011 | Meijer | G06F 9/46 719/318 |
| 2012/0131139 | A1* | 5/2012 | Siripurapu | H04L 65/60 709/217 |

OTHER PUBLICATIONS

"Esper Reference" Version 4.11.0, Esper Team and EsperTech, Inc., 2006, 734 pages.
"Hazelcast Documentation" Version 3.2 RCI, Hazelcast, Inc., 2014, 131 pages.
Haase "Java™ Message Service API Tutorial," Sun Microsystems Inc., 2002, 278 pages.
"Buisness Process Framework (eTOM) Suite," Release 8.1 v.16, TM Forum, 2010, 15 pages.
3GPP,Universal Mobile Telecommunications System (UMTS); LTE; IP Multimedia Subsystem (IMS); Multimedia telephony; Medial handling and interaction (3GPP TS 26.114 version 9.4.0 Release 9), ETSI TS 126 114, V9.4.0, 2011, 222 pages.
McCloghrie et al. "Management Information Base for Network Management of TCP/IP-based internets: MIB-II," Network Working Group, 1991, 58 pages.
Schulzrinne et al. "RTP: A Transport Protocol for Real-Time Applications" Network Working Group, 2003, 86 pages.
3GPP, Universal Mobile Telecommunications System (UMTS); LTE; Transparent end-to-end Packet-switched Streaming Service (PSS); Protocols and codecs (3GPP TS 26.234 version 9.5.0 Release 9), ETSI TS 126 234, 2011, 191 pages.
Claise et al. "Specification of the IP Flow Information Export (IPFIX) Protocol for the Exchange of IP Traffic Flow Information," Network Working Group, 2008, 52 pages.
"HP OpenView Service Quality Manager 1.2 software data sheet," 7 pages.
3GPP,Universal Mobile Telecommunications System (UMTS); LTE; Multimedia Broadcast/Multicast Service (MBMS); Protocols and codecs (3GPP TS 26.346 version 9.4.0 Release 9), ETSI TS 126 346, 2010, 152 pages.
3GPP, Digital cellular telecommunications system (PHase 2+); Telecommunication management; Performance Management (PM); Performance measurements—GSM ((3GPP TS 54.402 version 10.0.0 Release 10),ETSI TS 152 402, 2011, 228 pages.
Wilby "Guía Docente De Infraestructura y Gestión De Redes Móviles e Internet: Curso 2012-2013," 2012, Universidad Rey Juan Carlos, 8 pages.
Kelly "White Paper: IBM's Ascendance in the Service Assurance Market," OSS Observer LLC, 2008, 7 pages.
"Touchpoint," Tektronix Communications, 2014, 2 pages.
"Apache Hadoop," The Apache Software Foundation, 2014, 4 pages.
"Telecom Application Map The BSS/OSS Systems Landscape" Release 3.2, GB929, TM Forum Approved Version 3.12, 2010, 256 pages.
Ericsson White Paper "Keeping the Customer Service Experience Promise", 2011, 9 pages.
"Drools Integration User Guide," version 5.2.0, Jun. 23, 2011, 52 pages, Retrieved from http://docs.jboss.org/drools/release/5.2.0.Final/droolsjbpm-integration-docs/pdf/droolsjbpm-integration-docs.pdf.
Ericsson Network IQ Events, 1 page.
Second Office Action dated Dec. 6, 2016, issued for related Chinese patent application 201280051412.7, including English translation, 20 pages.

* cited by examiner

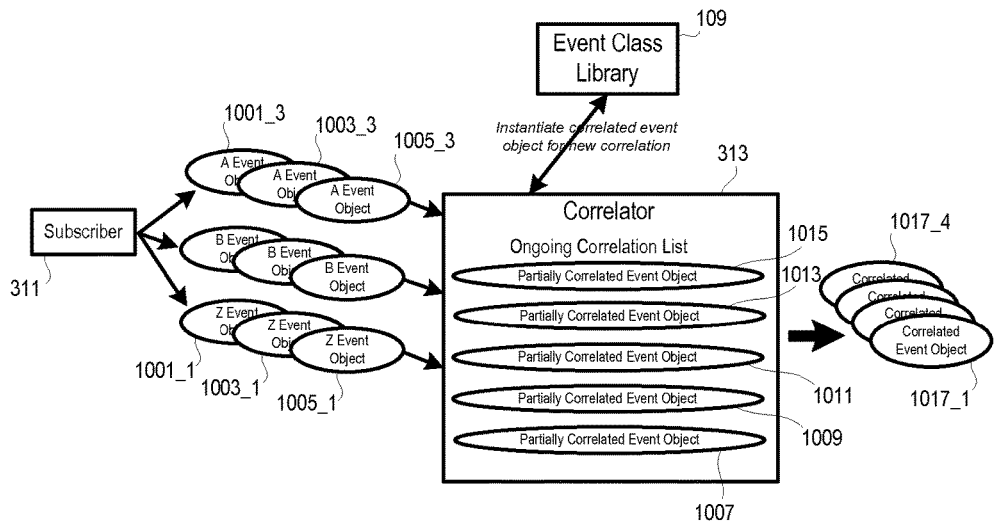
Figure 10
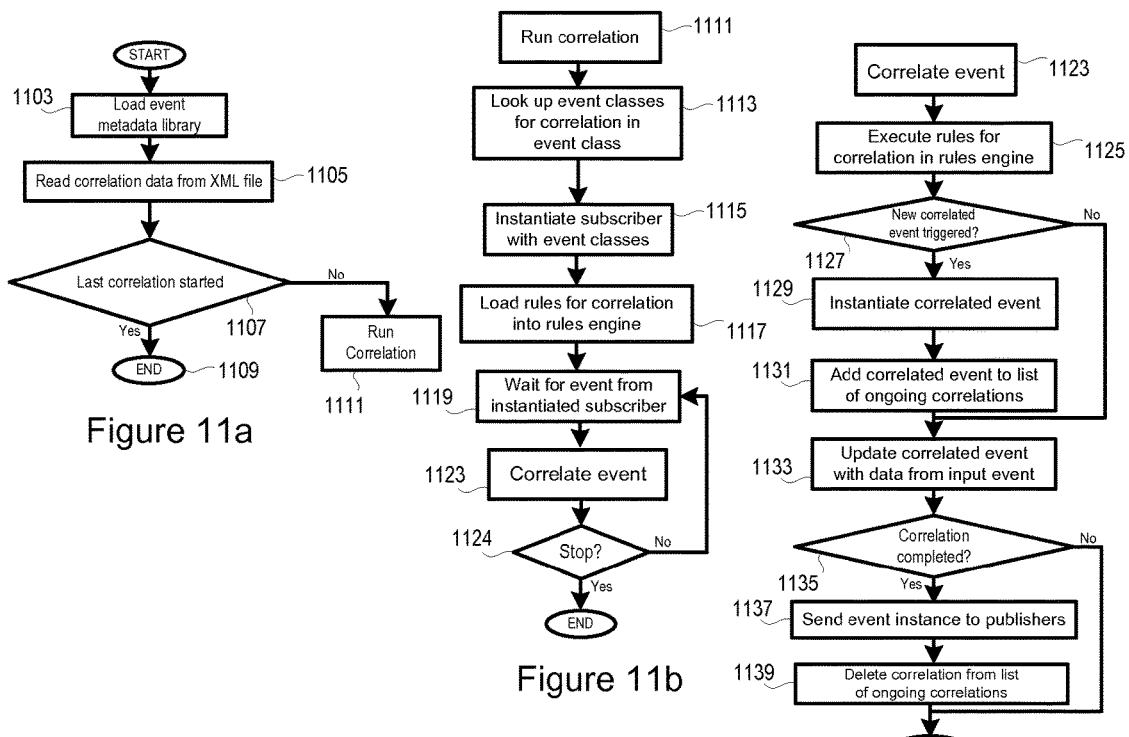
Figure 11a
Figure 11b
Figure 11c

METHOD AND APPARATUS FOR DETERMINING AN EVENT INSTANCE

CROSS REFERENCE TO RELATED APPLICATION(S)

This application is a 35 U.S.C. § 371 National Phase Entry Application from PCT/EP2012/063040, filed Jul. 4, 2012, designating the United States, and also claims the benefit of U.S. Provisional Application No. 61/524,958, filed Aug. 18, 2011. The disclosures of both applications are incorporated herein in their entirety by reference.

TECHNICAL FIELD

The present invention relates to a method and apparatus for determining an event instance. It also relates to a method of controlling event-driven communication between a plurality of nodes of a network and a communication control module.

BACKGROUND

Event-driven communications offer a number of advantages, for example, providing essentially immediate data when an event creating the data occurs. Therefore, event-driven communications are especially useful, for example, where timely information dissemination is required, where notice of changes or status must constantly occur, where real time information monitoring and real time decisions are required.

Event-driven communications reduce traffic by publication of data to subscribers which requires no explicit action by a subscriber in order to receive the data. Moreover, a publication of data to subscribers requires only a single publication from a publishing source to a channel no matter how many subscribers are to receive the data.

Known event-driven communications systems are implemented utilizing various data access protocols which exist to facilitate the transfer of data between disparate systems in order to utilize object-based software which make it easy for a user to acquire data at a time when it is most useful. The use of these protocols allows the burden of overcoming interfacing problems and establishing communication channels. However, such a system requires that a publisher and a subscriber agree on a format for the data being exchanged. As a result complex formatting of input files and streams is required. In such systems the format is hardcoded in parsers which requires the parsers to be updated for any changes in input sources. Furthermore, data analysers, filters, correlators, forwarders and persisters must be separately updated whenever an event is updated. This makes such systems inflexible, making it difficult to integrate new and unforeseen event processing technologies or event publishing mechanisms into these current systems.

Event-based mechanisms are also being increasingly used in gathering network and terminal metrics to provide more timely and granular information to operators of the network for monitoring performance, quality of service and experience over the network. In addition, file-based collection mechanisms are being replaced by event streaming mechanisms.

Traditionally, metrics are reported by use of counters. A vast number of counters are available, aggregating metrics such as packet loss, delay, and jitter as well as on network events such as equipment failures and overloads. Counters are also used to report on logical entities such as Virtual Local Area Networks (VLANs) and MultiProtocol Label Switching (MPLS) tunnels. Simple Network Management Protocol (SNMP) MIBs described in K. McCloghrie and M. Rose, "RFC1213: Management Information Base for Network Management of TCP/IP-Based Internets: MIB-II," RFC Editor United States, 1991 and the 3GPP PM Integration Reference Point (IRP) described in "3GPP TS 52.404: Telecommunication Management; Performance Management (PM); Performance Measurements—GSM," 3GPP TS 52.402, March 2011 are just two of very many standards that specify counters and counter handling.

In telecommunication networks, counter collection is usually implemented using a batch mechanism. Counters for a given reporting period (a reporting period of 15 minutes is typical, but reporting periods of 5 minutes or even shorter are sometimes used for critical counter data) are stored into files on network elements. A management system regularly collects the counter files from the network elements. This mechanism is explained in more detail in A. Clemm, Network Management Fundamentals. Cisco Press, 2006, pp 155-157. Batch collection of counters is a very efficient way of transmitting counter information because all the information for a reporting period is sent in one communication session. If counter files are compressed, even higher efficiency can be achieved. The drawbacks of batch collection are that there is an inherent delay of at least one reporting period before counter data can be collected and processed. Another drawback is that the files must be temporarily stored on network elements prior to collection.

Counter based metric reporting is a very efficient approach to network monitoring, network elements calculates counters from raw information, with just the counter information being stored and reported. The main disadvantage of counter based metric reporting is that raw information on the cause of incidents is not available for analysis.

The use of common access and core networks for all telecommunication services means that it is difficult to infer a network-wide view of how well those services are being delivered from counters alone.

In order to analyse how well end user services being delivered by today's networks, for example, "Keeping the Customer Service Experience Promise" White Paper, January 2011 http://www.ericsson.com/res/docs/whitepapers/wp_service_assurance.pdf Document No. 284-23-3150requires access to rich source data. Event-based metric collection, where network elements report metrics on significant events in bearer and control sessions, are increasingly being used to provide the rich source of data.

Nodes of existing networks already support event based reporting Node B (a radio base station in UMTS) in LTE (eNodeB) nodes, Serving General Support Node (SGSN) nodes, Gateway General packet radio Support Node (GGSN) nodes, and Mobility Management Entity (MME) nodes report radio and core network events. Probes can be used to report events on signalling and bearer links at Internet Protocol (IP), Transmission Control Protocol (TCP), and application protocol level. Quality of Service (QoS) and Quality of Experience (QoE) reports can be received from terminals running Real-Time Protocol (RTP) sessions using Real-Time Control Protocol (RTCP) described, for example, in H. Schulzrinne, S. Casner, R. Frederick, and V. Jacobson, "RTP: A Transport Protocol for Real-Time Applications," RFC 3550, July 2003 as well as from 3GPP Packet-switched Streaming Service (PSS) described, for example, in "Transparent end-to-end Packet-switched Streaming Service (PSS); Protocols and codecs," 3GPP TS 26.234, December 2010, Multimedia Broadcast/

Multicast Service (MBMS) described, for example, in "Multimedia Broadcast/Multicast Service (MBMS); Protocols and Codecs," 3GPP TS 26.346, October 2010 and Multimedia telephony (MMTel) described, for example, in "IP Multimedia Subsystem (IMS); Multimedia Telephony; Media Handling and Interaction," 3GPP TS 26.114, December 2010.

Event-based metrics are usually streamed from network elements, probes, or terminals to management systems. Internet Protocol Flow Information Export (IPFIX) described, for example, in E. B. Claise, "Specification of the IP Flow Information Export (IPFIX) Protocol for the Exchange of IP Traffic Flow Information," RFC 5101, 2008 is used to stream reports of events on IP flows from network elements and probes. Ericsson nodes support streaming of events to management systems and also support file based batch event collection as aforementioned.

SUMMARY

The present invention seeks to obviate at least some of the disadvantages of the prior art systems and provide an improved method and apparatus for determining an event instance (or object) in event-based communications systems.

This is achieved, according to one aspect of the present invention, by a method of determining an event instance in an event driven communications system. An event stream is received. The event stream comprises a plurality of events. Metadata is retrieved for each event of the received event stream. An event instance is instantiated for each event of the received event stream based on the retrieved metadata and the event data of each event of the received event stream is read into the instantiated event instance.

This is achieved, according to another aspect of the present invention, by a method of controlling event-driven communication between a plurality of nodes of a network. A session for communication is established. The session is defined by a plurality of event instances which are determined by the method according to the aspect above.

This is also achieved, according to yet another aspect of the present invention, by apparatus for determining an event instance in an event driven communications system. The apparatus comprises a receiver configured to receive an event stream.

The event stream comprises a plurality of events. The apparatus further comprises a library interface configured to retrieve metadata from an event metadata library for each event of the received event stream. The apparatus further comprises an instantiator configured to instantiate an event instance for each event of the received event stream based on the retrieved metadata and to read event data of each event of the received event stream into the instantiated event instance.

This is also achieved, according to yet another aspect of the present invention, by a communication control module for controlling event-driven communication between a plurality of nodes of a network. The module comprises a session control module configured to establish a session for communication between a plurality of nodes. The session is defined by a plurality of event instances. The module further comprises the apparatus according to the third aspect above.

In this way, the entire system has a common understanding of the events being processed and produced in the system and the set of events being handled by the system is configurable and can be updated without any software updates. The method is highly distributable; each component can be configured to run on a number of hosts or on a single host using any distribution middleware that supports publish-subscribe semantics and event serialization. Further, all communication between components is carried out using event objects; there is no adaptation or translation of event data internally in components in the system.

BRIEF DESCRIPTION OF DRAWINGS

For a more complete understanding of the present invention, reference is now made to the following description taken in conjunction with the accompanying drawings in which:

For a more complete understanding of the present invention, reference is now made to the following description taken in conjunction with the accompanying drawings in which:

FIG. 10 is a simplified schematic of the correlator of the a communication control module of FIG. 3 according to an embodiment of the present invention;

FIGS. 11a, 11b and 11c are flowcharts illustrating the correlation according to an embodiment of the present invention;

DETAILED DESCRIPTION

Figure 1A:
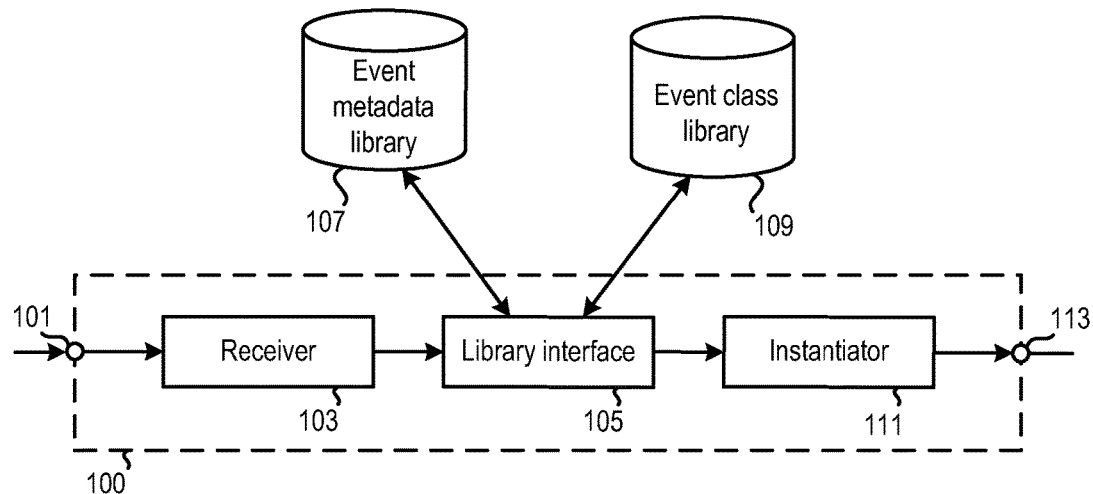
FIG. 1a is a simplified schematic of apparatus for determining an event instance in an event driven communications system according to an embodiment of the present invention.

FIG. 1a illustrates apparatus 100 for determining an event instance in an event driven communications system. The apparatus 100 comprises a receiver 103. The receiver 103 is connected to an input terminal 101 of the apparatus 100 for receiving event streams. The event stream comprises a plurality of events. The receiver 103 may also include a filter (not shown in the figures). The filter may be configured to filter a predetermined type of events from the event stream, that is, specify which of the events of the received event stream are to be processed or which are to be ignored if they match or don't match certain filter criteria. The filters are configured on single events, for example, "select events of type x if field p of event x>4". The filtering process is very fast and is used to allow through/drop events at their first point of entry into the system, events filtered using this method never enter the system. As a result a large number of events are eliminated at an early stage. The output of the receiver 103 is connected to a library interface 105. The library interface 105 is also connected to an event metadata library 107. The library interface 105 may also be connected to an event class library 109 as shown in FIG. 1a. The libraries 107, 109 may be external to the apparatus 100 as shown in FIG. 1a, or alternatively, one or both of the libraries 107, 109 may be integral with the apparatus 100. The libraries 107, 109 may be provided on a single storage device or multiple storage devices. The library interface 105 is configured to retrieve metadata from the event metadata library 107 and may be further configured to retrieve event class information from the event class library 109.

The output of the library interface 105 is connected to an instantiator 111 which is configured to instantiate an event instance for each event of the received event stream based on the retrieved metadata and to read event data of each event of the received event stream into the instantiated event instance. The output of the instantiator 111 is connected to an output terminal 113 of the apparatus 100 to output the instantiated event instances.

Figure 1B:
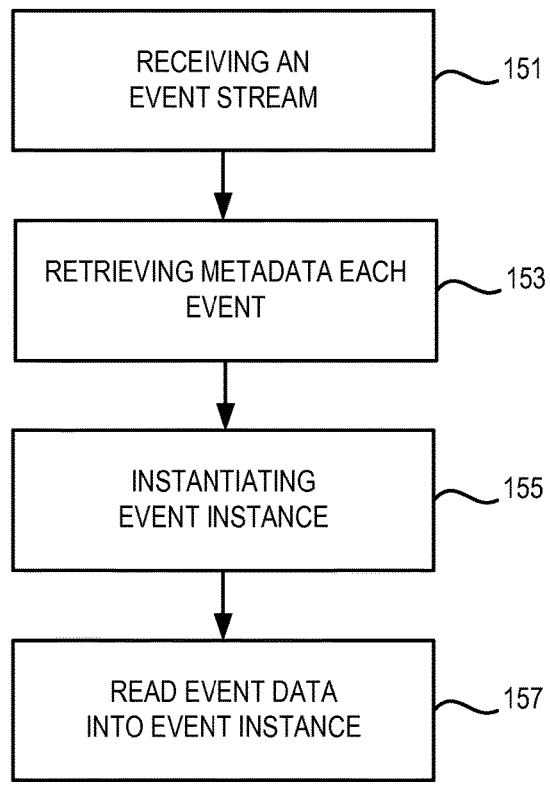
FIG. 1b is a flowchart of a method of determining an event instance in an event driven communications system according to an embodiment of the present invention
Figure 2A:
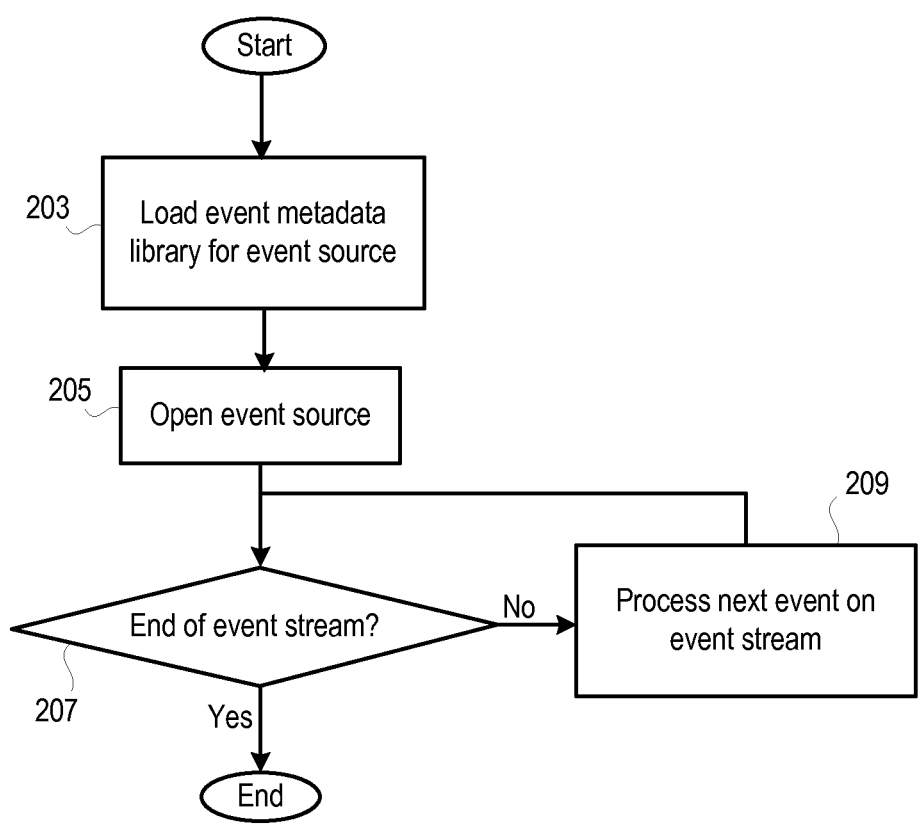
FIGS. 2a and 2b are flowcharts of a method of determining an event instance in an event driven communications system according to another embodiment of the present invention.
Figure 2B:
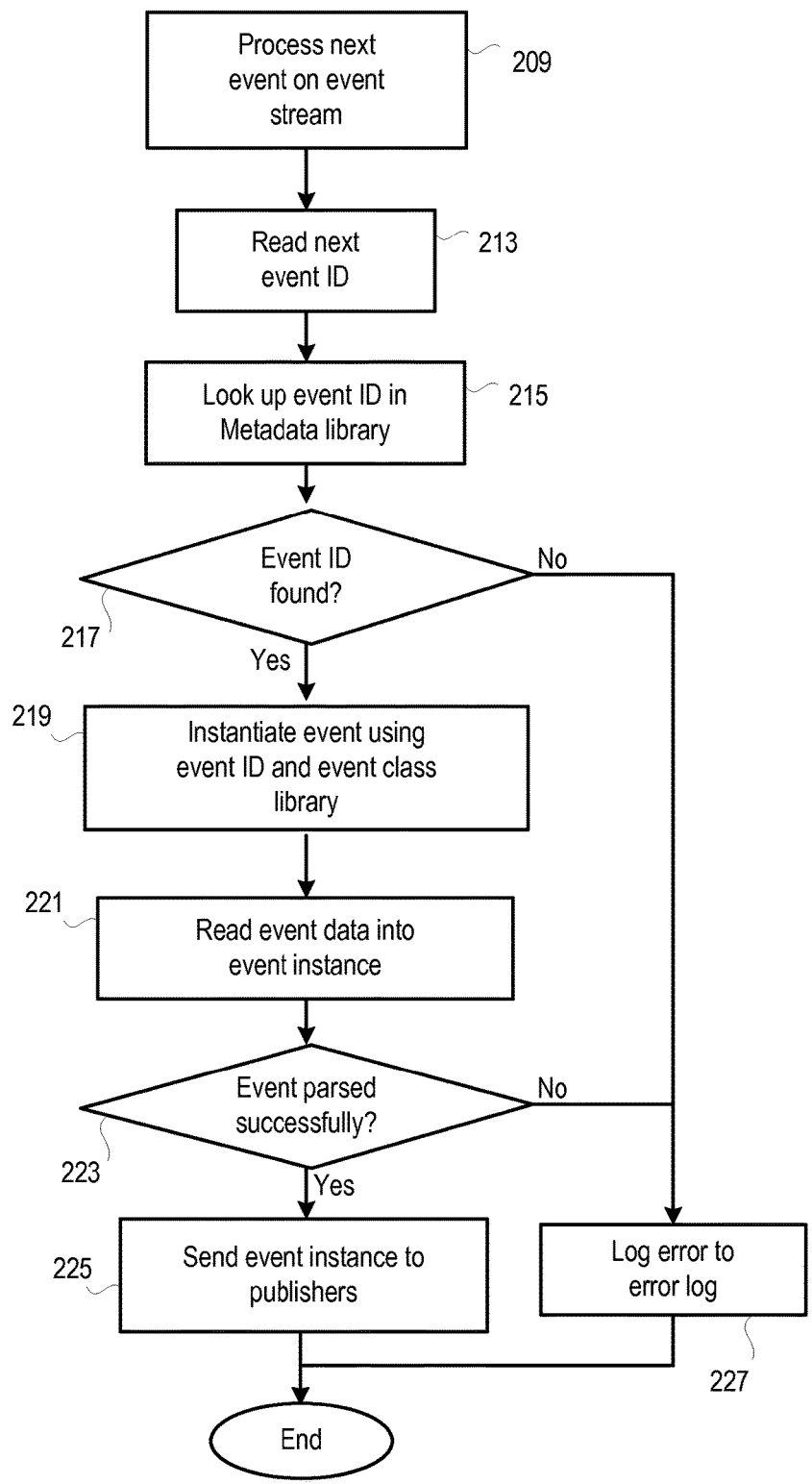

As shown in FIGS. 1b, 2a and 2b, operation of the apparatus 100 of FIG. 1 will now be described. The method of determining an event instance comprises the steps of receiving, step 151, an event stream, the event stream comprising a plurality of events; retrieving, step 153, metadata for each event of the received event stream; instantiating, step 155, an event instance for each event of the received event stream based on the retrieved metadata; and reading, step 157, event data of each event of the received event stream into the instantiated event instance.

In the embodiments of FIGS. 2a and 2b, an event metadata XML file is written for each source and for each correlation that describes each event produced by that source or correlation within an event-driven communication system. This metadata is used to code generate the event class library 109, that contains a class for each possible event that might be handled by the system.

At system start, the system reads the event metadata from the XML files and loads the metadata into the event metadata library 107 for each event source, step 203. The event metadata is loaded from the event metadata library 107 for the version of events the system is processing. The receiver 103 of the apparatus 100 receives and opens the event stream, step 205 and each event is processed one by one to determine the event instance, step 209, until the end of the event stream is reached, step 207.

For processing the event in the event stream, step 209, the event identifier for each event is read, step 213. Using a lookup mechanism, the metadata associated with that identifier is retrieved from the metadata library 107. If the current identifier is found in the metadata library, step 217, the event is instantiated using the event identifier. The event identifier may also be used to look up the name of the event class in the event class library 109 that should be instantiated, which is the sub class of a mapped base class for the version of the event being processed, step 219. Once the event class has been instantiated, it is used to read data for the event read into an event base class, step 221. As a result, all components in the system have access to and use a common metadata library describing the events handled by the system; no event information is hard coded into components.

The system may be configured to handle different version of events. Using the event identifier, only the fields for that version of the event are set. The instantiated event instance is then output via the output terminal 113 to be published etc, step 225. If the event identifier is not found in the metadata library 107 or if the event instance is not successfully generated, a log error is generated, step 227. Therefore, event data read into an event instances is extremely efficient because a specific event data sub-class is code generated for each event version extending the system for different versions of an event.

The method above makes use of metadata to instantiate events using a metadata library for use in parsers and correlators, as described in more detail below.

Figure 3:
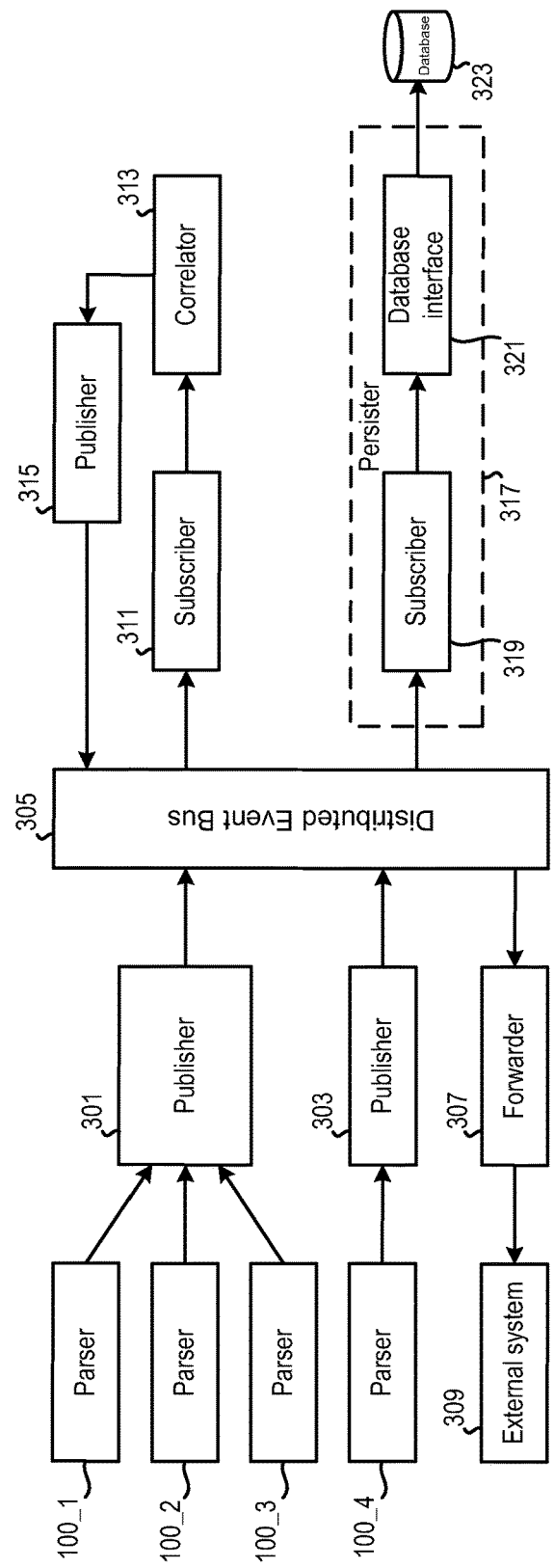
FIG. 3 is a simplified schematic of a communication control module for controlling event-driven communication according to an embodiment of the present invention including the apparatus of FIG. 1.

Components communicate with each other via the even-driven communication system by passing the determined event instances over a distributed event bus 305 as shown in FIG. 3. FIG. 3 illustrates a communication control module for controlling event-driven communication according to an embodiment of the present invention. The control module comprises at least one parser 100_1, 100_2, 100_3, 100_4, each of which corresponds to the apparatus 100 of FIG. 1a. Although four parsers (determining apparatus) are shown in FIG. 3, it can be appreciated that any number of determining apparatus 100 may be utilised. The parsers (determining apparatus) 100_1, 100_2, 100_3, 100_4 are connected to a distributed event bus 305 via publishers 301, 303.

The distributed event bus 305 may use any middleware that supports distributed publish-subscribe semantics and object serialization as a distributed event bus. Java Messaging System (JMS), for example, http://download.oracle.com/otn-pub/jcp/7195-jms-1.1-fr-spec-oth-JSpec/jms-1_1-fr-spec.pdf?AuthParam=1340889867_8357524e67b971cf61f53a4acd525ef5 and Hazelcast Topics, for example, http://www.hazelcast.com/docs/2.1/manual/pdf/hazelcast-documentation.pdf are two examples of such middleware. The distributed event bus 305 may be connected to an external system 309 via a forwarder 307. The distributed event bus 305 may also be connected to a persister 317 and a correlator 313.

The distributed event bus 305 is connected to the correlator 313 at its input via a subscriber 311 and its output via a publisher 315.

The persister 317 comprises a subscriber 319 and a database interface 321. The input of the subscriber 319 of the persister 317 is connected to the distributed event bus 305 and the output of the subscriber 319 of the persister 317 is connected to the input of the database interface 321. The output of the database interface 321 is connected to a database 323.

The method described above can be applied to persist, correlate, forward, or otherwise process telecommunication events from any source. Possible sources include event files generated by network nodes, event streams from network nodes, and event streams from probes.

Figure 5:
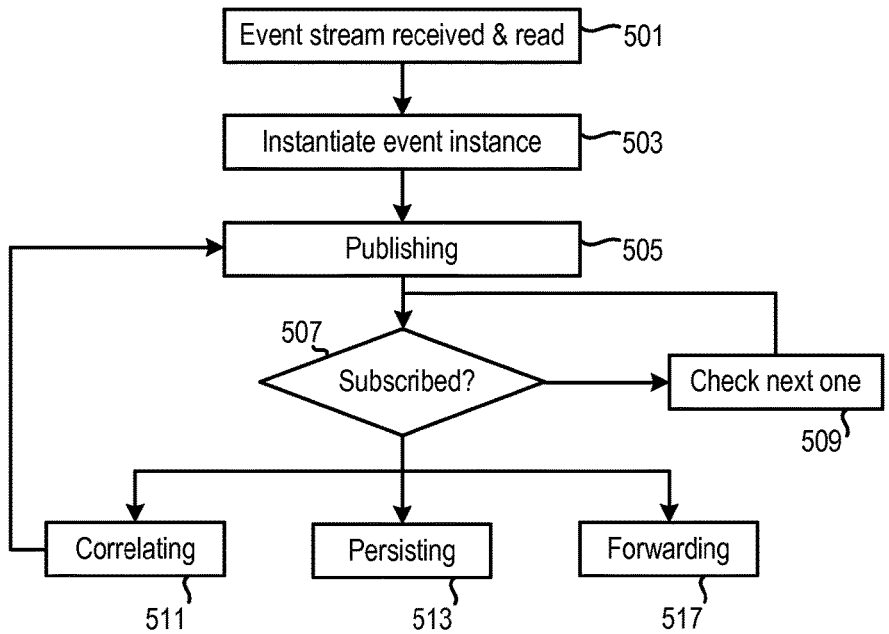
FIG. 5 is a flowchart of a method of controlling event-driven communication according to an embodiment of the present invention.

As illustrated in FIG. 5, the parsers (determining apparatus) 100_1, 100_2, 100_3, 100_4 for a given source reads the raw data from the source step 501, uses the event metadata library to validate input events and find the correct event type to instantiate an event instance step 503 as shown in FIG. 1b. Instantiating the event instance may also be achieved by use of the event class library. The instantiated event is then published, step 505, onto the distributed event bus 305 using a publisher 301, 303. A correlator 313, persister 317, or forwarder 307 that is interested in a particular event subscribes step 507, 509 to the distributed event bus 305 for that event. Once subscribed, the event can be correlated, step 511, persisted, step 513 or forwarded, step 517 as required.

Figure 4A:
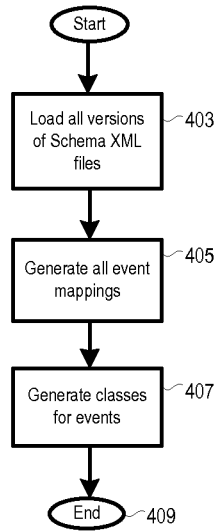
FIGS. 4a to 4c are flowcharts illustrating maintaining the event metadata library and the event class library of the apparatus of FIG. 1 according to an embodiment of the present invention.

FIG. 4a illustrates metadata handling and code generation for maintaining the event metadata and event class libraries. At system installation or upgrade, all versions of XML files for all event sources are loaded from disk, step 403. The event mappings for all events are generated, step 405, and the event classes are generated, step 407, and these are packaged into an event class library 109.

Figure 4B:
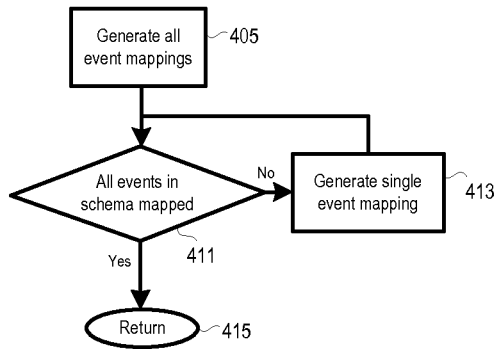

Details of the step for generating the event mappings, step 405, are shown in FIG. 4b. All events in each XML file are mapped, step 411, to generate a single event mapping, step 413. The process then returns, step 415, to continue to step 407.

Event map generation is required because there may be many versions of each event being produced by different versions of network elements, probes, or correlations. Event map generation builds a base event for each event that is the union of all fields from all versions of that event from that source. Event mapping takes the field type for each field from the most recent version of the event in which a field appears. If the fields for each version of the event are forwardly compatible, each event version is mapped to the mapped event successfully. If the fields on each version of the event are not forwardly compatible, event mapping of the event fails and reports an error.

Figure 4C:
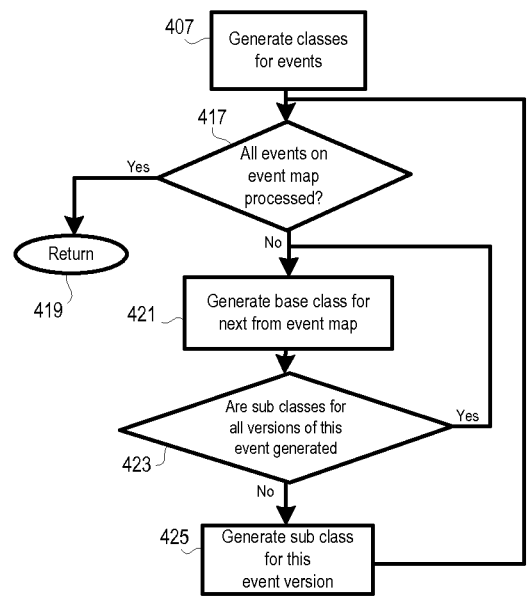

As illustrated in FIG. 4c, code generation step 407, comprises generating a base class, steps 417, 421, for each event from each event source using the mapped event. All fields in the mapped event are assigned sensible default values so that if a field is not used in a particular version of an event, that field will have a default value. Code generation generates a sub class of the mapped event for every version of the event that appears in the metadata steps 423, 425. Once all events in the event mapping have been processed, the process returns, step 419, to end the process, step 409.

Figure 6:
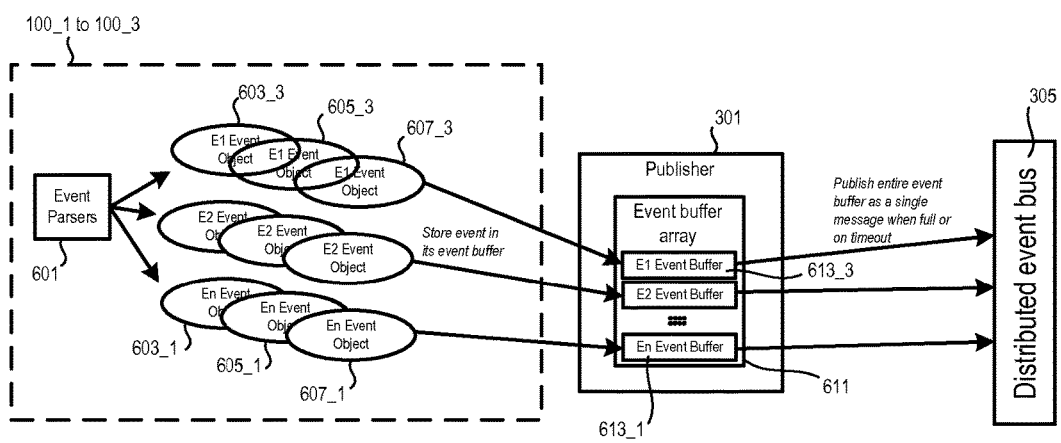
FIG. 6 is a simplified schematic of the publisher of the a communication control module of FIG. 3 according to an embodiment of the present invention.
Figure 7A:
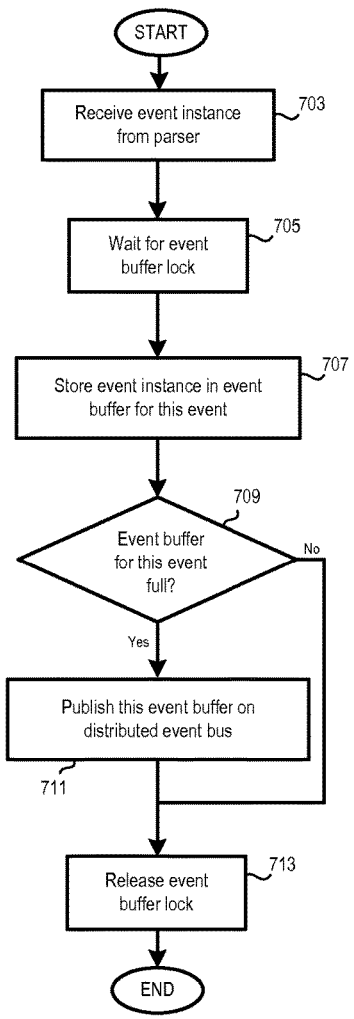
FIGS. 7a and 7b are flowcharts illustrating the publishing according to an embodiment of the present invention.
Figure 7B:
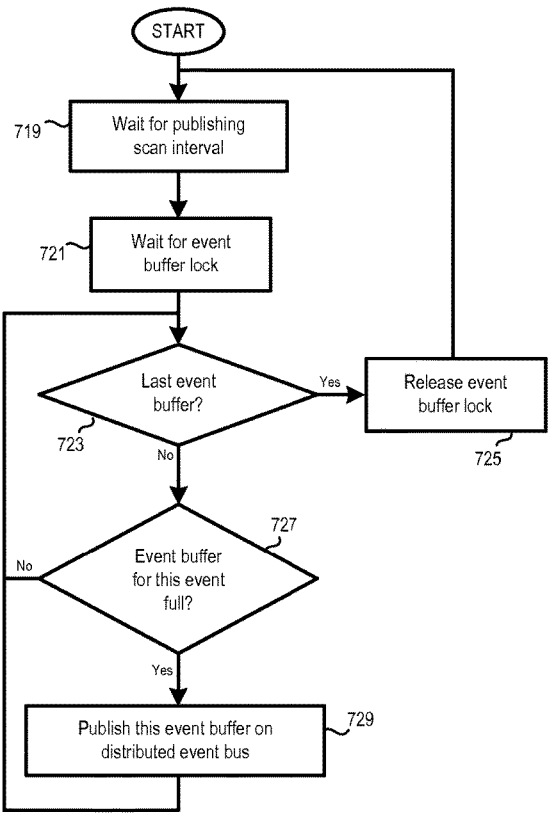

FIG. 6 illustrates an embodiment of the publishers, 301, 303, 315, of FIG. 3. FIGS. 7a and 7b illustrate operation of the publisher of FIG. 6.

On start up, the event publisher 301 initializes an event buffer 613_1, 613_2, 613_3 for each event type to an event buffer 611 having a configurable size. When a publisher 301 receives, step 703, an instantiated event instance 603_1 to 603_3, 605_1 to 605_3, 607_1 to 607_3, it is stored, step 707, in the event message buffer array 611 for that event type. The publisher 301 then checks if the event buffer 611 is full, step 709, and, if so, the entire event buffer 611 is sent, step 711, as a single message on the distributed event bus 305.

The event publisher 301 buffers the events for each event type in an event buffer array because it is much more efficient to publish a smaller number of large event message buffers to the distributed event bus than publishing a large amount of small separate events.

The publisher 301 also supervises its event buffers. A process runs at a configurable interval, which publishes all non-empty event buffers 611 to the distributed event bus 305.

The publisher 301 implements locking step 705 on the event buffer array to avoid simultaneous access by its storing and publishing routines. After completion of the process the buffer lock is released, step 713.

Alternatively, as shown in FIG. 7b, at a publishing scan interval, step 719, and once the buffer lock is established, step 721, each event is stored, step 723, in the buffer 611. Once completed and all events have been stored, the buffer lock is released, step 725. Once the buffer 611 is full, step 727, the event buffer contents are published, step 729 as described above with reference to FIG. 7a.

Event publishing may be made more efficient because events instantiated from a code-generated library are buffered and sent en-bloc as buffers by buffering each instantiated event instance and publishing a plurality of the buffered instantiated event instances to a distributed event bus.

Figure 8:
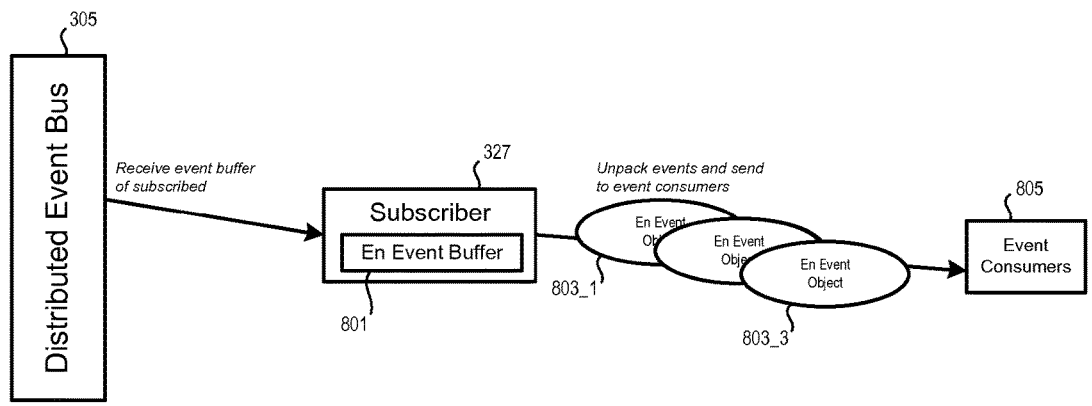
FIG. 8 is a simplified schematic of the subscriber of the a communication control module of FIG. 3 according to an embodiment of the present invention.
Figure 9:
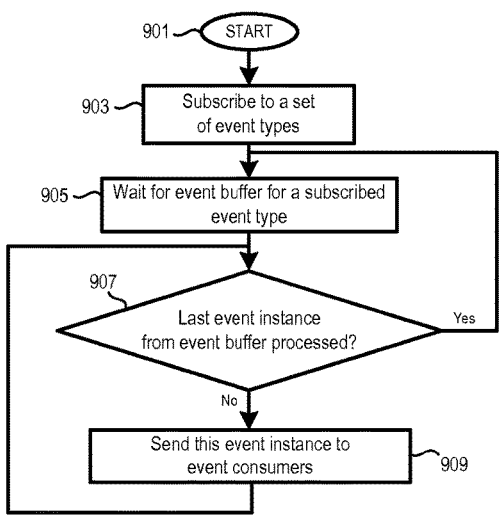
FIG. 9 is a flowchart illustrating the subscription according to an embodiment of the present invention.

FIG. 8 illustrates an embodiment of the subscribers 319, 327, 311 of FIG. 3. FIG. 9 illustrates the operation of the subscriber of FIG. 8. The subscriber 327 subscribes, step 903, to a set of events in the distributed event bus 305. When an event buffer 801 of the subscriber 327 is received containing events of a subscribed type, step 905, the subscriber 327 unpacks the event buffer iteratively, step 907, and sends, step 909, the events 803_1, 803_2, 803__3 to their event consumers 805, for example correlators, persisters and forwarders.

The subscribers 311, 327, 319 may also include a filter (not shown in the figures). This filter may be similar to the filter of the receiver 103 mentioned above in that the filter of the subscriber acts only on event types and single event instances in isolation. The subscriber subscribes only to the event types required, specifying the event type or filter criteria for fields of events. This approach is more flexible in that a given event A may pass a filter in the subscriber of application)(but may be dropped (or ignored) by the subscriber of application Y. This method has the advantage that events are available to all subscribers.

These filters specify rules for what parameter values or sets of parameter values for which events should be forwarded to subscribers. For example, if event E has parameters p1, p2, and p3, a filter rule might specify forwarding of event E if:

$$((p1>p2)\&(p2<10))|p3>0$$

The parsers (determining apparatus) 100_1, 100__L, 100__3, 100_4 receive, for example, both radio network and core network event files produced by an MME node and protocol events from a traffic probe. It is often desirable, necessary, to correlate these events. In which case, the events are published in the distributed event bus 305 as described above with reference to FIGS. 6, 7a and 7b and the correlator 313 subscribed via the subscriber 311 as described above with reference to FIGS. 8 and 9.

FIG. 10 illustrates an embodiment of the correlator 313 of FIG. 3. FIGS. 11a, 11b and 11c illustrate operation of the correlator of FIG. 10. The input of the correlator 313 is connected to the output of a subscriber 311. A correlator is instantiated for each correlation type in the correlation configuration file. In any one system a plurality of correlators may be provided for each type of correlation. The correlator 313 is defined by a rules engine which executes a plurality of rules to correlate a plurality of input events 1001_1 to 1001_3, 1003_1 to 1003_3, 1005_1 to 1005_3.

Each correlator reads the input events for correlation and instantiates a subscriber to listen for events for correlation on the distributed event bus 305. The correlator 313 then starts a rules engine and loads the correlation rules into that engine. A rules engine such as Esper (The Esper Complex Event Processing Engine) or Drools (The Drools Business Logic Integration Platform) is suitable for this purpose, for example Esper Reference: Version 4.6.0 http://esper.codehaus.orq/esper-4.6.0/doc/reference/en-US/pdf/esper reference.pdf and Drools Introduction and General User Guide: Version 5.4.0 http://docs.jboss.org/drools/release/5.4.0.Final/droolsjbpm-introduction-docs/pdf/droolsjbpm-introduction-docs.pdf. The correlator then waits for input events.

When an input event 1001_1 to 1001_3, 1003_1 to 1003_3, 1005_1 to 1005_3 is received from the subscriber 311, the correlator 313 sends the event to the rules engine, which executes its correlation rules. If a new correlation event is triggered by the input event, the event is instantiated, step 1121, using the Event Class Library 109. The event is then added to the list of ongoing correlations 1007, 1009, 1011, 1013, 1015. Fields from the input event are used to set values on the correlated event. If the correlation is completed, then the event 1017_1 to 1017_4 is sent to the publisher 315 by the correlator 313. The publisher 315 publishes the correlated event 1017_1 to 1017_4 on the distributed event bus 305 using the algorithm described above with reference to FIGS. 6, 7a and 7b.

At system start up, the event metadata library 107 is loaded, step 1103. XML files are created of the events for the different types of correlation supported by the system, as described in more detail below, and the correlation data is read from the created XML files, step 1105. For each correlation that is retrieved from the XML in step 1105, a correlator 313 is defined, started and executed by the algorithm run in step 1111.. Once the last type of correlation is defined, step 1107, the correlation starting process ends, step 1109.

As illustrated in FIG. 11b, each correlator for each type of correlation is defined, step 1111, by looking up the event classes for the type of correlation in the event class library 109. The subscriber 311 is instantiated, step 1115, with the retrieved event class to listen for events for the specific type of correlation. The rules for the specific type of correlation are loaded into the rules engine of the correlator 313, step 1117. The process then waits for events from the instantiated subscriber 311, step 1119. Upon receipt of an event, the event is correlated, step 1123 as shown in FIG. 11c. The correlator then loops and waits for the next event, step 1119, from the subscriber, continuing to loop until the system is stopped, step 1124.

The rules loaded into the rules engine are executed to correlate each event, steps 1125, 1127. Each correlated events is instantiated as described above with reference to FIGS. 2a and 2b, step 1129, and added to the list of ongoing correlations 1007, 1009, 1011, 1013, 1015 stored within the correlator 313, step 1131. The correlated event is then updated with input data, step 1133. Upon completion of the correlation, step 1135, the event instance is sent to the publisher 315, step 1137 and deleted from the list of ongoing correlations 1007, 1009, 1011, 1013, 1015, step 1139. The steps 1123 to 1139 are then repeated for each instantiated event instance.

Event correlation is therefore configurable at run time. Correlation input events, output events, and rules are loaded from configuration files. The input and output events are defined as metadata, which is again configurable.

Figure 12A:
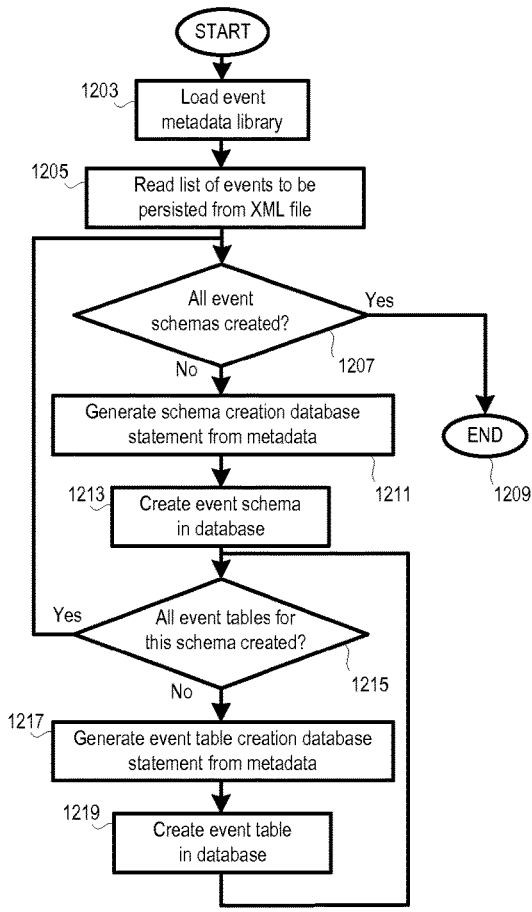
FIGS. 12a and 12b are flowcharts illustrating the creation of event schemas and event tables in a database according to an embodiment of the present invention.
Figure 12B:
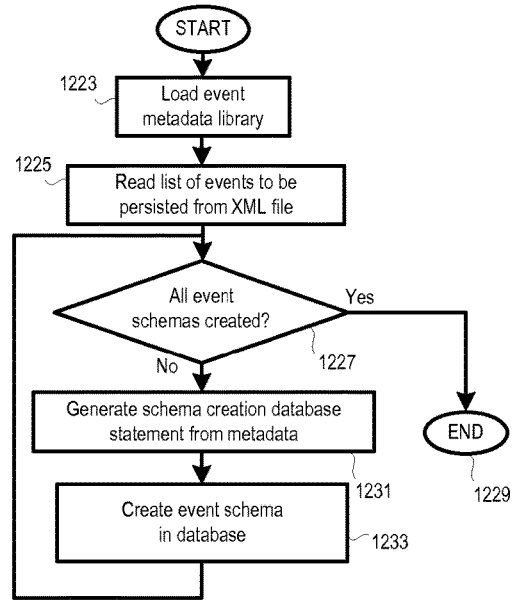

The algorithm for creating the schema of the database 323 of the system using the metadata is shown in FIGS. 12a and 12b. At system installation or upgrade, the metadata is used to create a schema for each event source type, and to create a table for each mapped event type. At system removal, metadata can be used to clear the database tables and schema.

At system start up, the metadata is loaded into the event metadata library 107, step 1203. The list of event to be persisted is read from an XML file, step 1205. It is determined whether all event schemas have been created in the database 323, step 1207. If they have all been determined the process ends, step 1209. If not a schema creation database statement is created from the metadata for that event, step 1211 and the event schema is then created from the statement, step 1213. All the event tables for the created event schema are then generated and created in the database, steps 1215, 1217, 1219.

Figure 13:
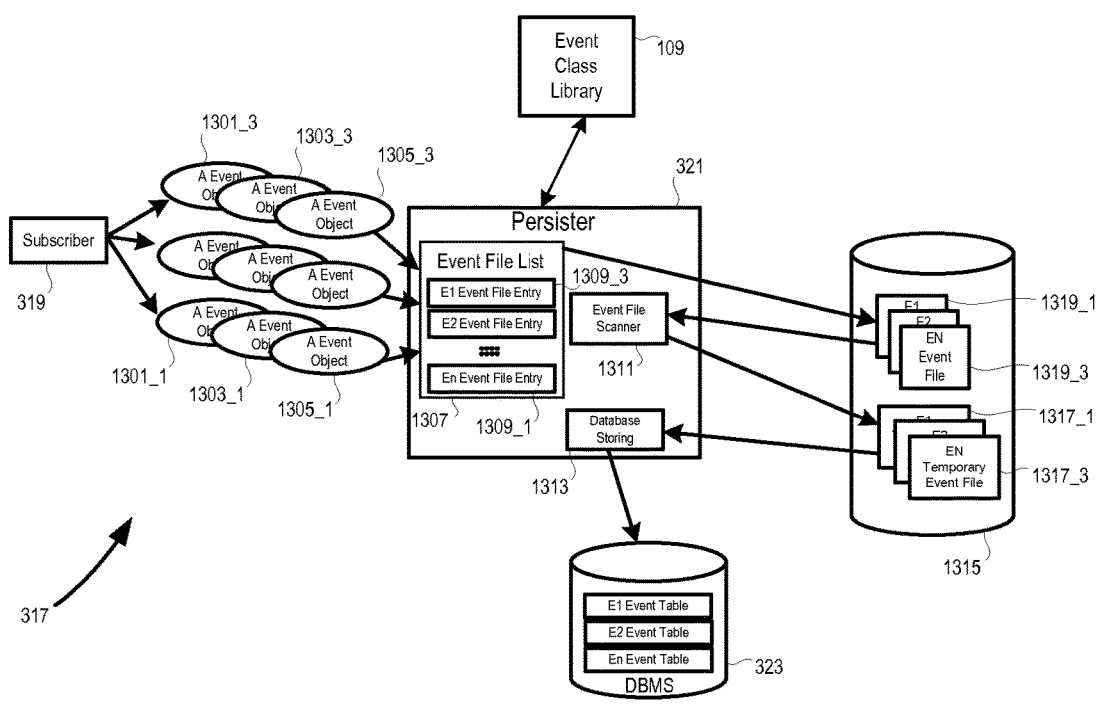
FIG. 13 is a simplified schematic of the persister of the a communication control module of FIG. 3 according to an embodiment of the present invention.
Figure 14A:
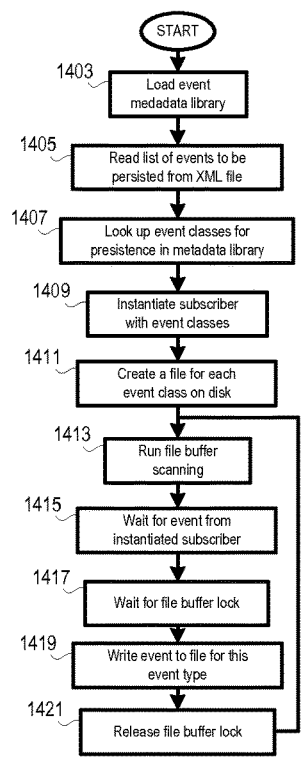
FIGS. 14a, 14b and 14c are flowcharts illustrating the persistence according to an embodiment of the present invention.
Figure 14B:
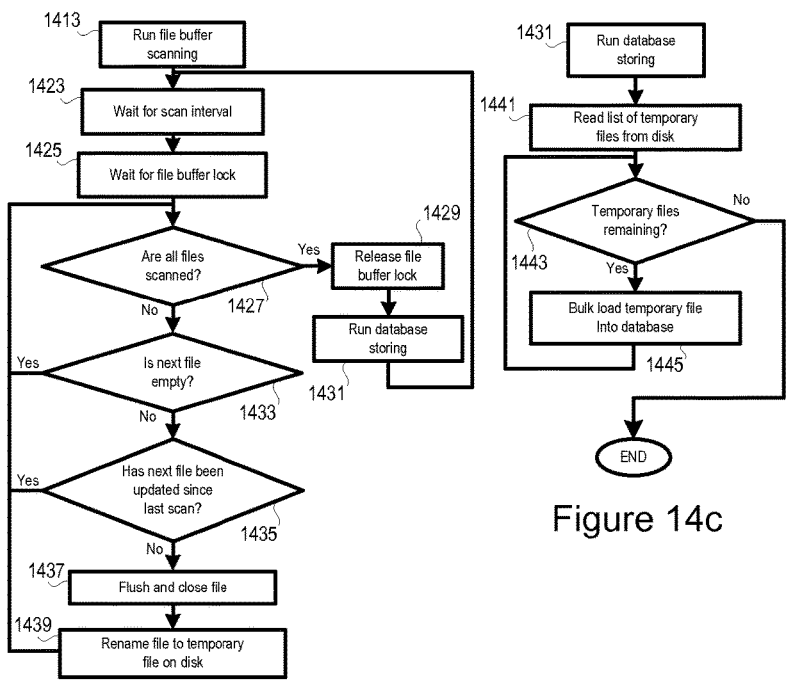
Figure 14C:
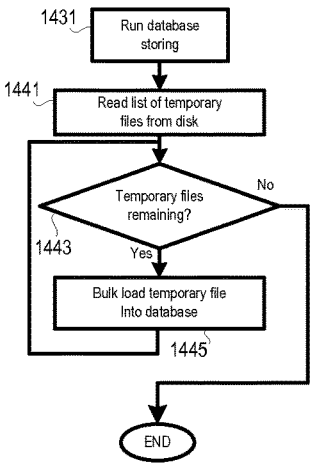

The correlator 313 may also include a filter (not shown in the figures). This may be configured to filter events based on criteria specified across events. It may filter using criteria such as: "Forward event X if field P of event X is 4 and field Q of event Y is 2", for example. Therefore complex filtering for correlating events can be achieved. FIG. 13 illustrates an embodiment of the persister 321 of FIG. 3. FIGS. 14a, 14b and 14c illustrate operation of the persister of FIG. 13 for storing events with the database created by the algorithm of FIGS. 12a and 12b, for example. Each persister 321 starts a subscriber 319 that subscribes to the events that the persister 321 is persisting.

The persister 321 comprises a storage device 1315 such as a disk or multiple disks for temporarily storing events in preparation for bulk loading into the database 323 via a database interface 1313. The disks may be integral with the persister 321 or separate as shown in FIG. 13. The persister 321 further comprises an event file list 1307 which comprises a plurality of event file entries 1309_1 to 1309_3. The persister 321 further comprises an event file scanner 1311. The persister 321 creates a file on the storage device 1315 for each event type to buffer the data to be bulk loaded into the database 323 as described in more detail below with reference to FIGS. 14a, 14b and 14c.

At system start up the metadata is loaded into the event metadata library 107, step 1403. The list of event types to be persisted is read from an XML file, step 1405. The identity of all classes to be persisted are retrieved from the event metadata library, step 1407 and the subscriber 319 is instantiated to listen for these event classes on the distributed event bus 305, step 1409. For each event class retrieved from the library, an event file 1319_1 to 1319_3 is created in the storage device 1315, step 1411.

When an event 1301_1 to 1301_3, 1303_1 to 1303_3, 1305_1 to 1305_3 to be persisted is received from the subscriber 319, an event file entry is added to the event file list 1307 of the persister 321. For each entry, the persister 321 generates a string representation of the event data, typically in Comma Separated Variables (CSV) format based upon the event class. That string is then stored to corresponding event file 1319_1 to 1319_3 on the storage device 1315.

The persister 321 also runs, step 1413, a file buffer scanner 1311, which scans each file 1319_1 to 1319_3 on the storage device 1315 at a configurable interval. The scanner 1311 at a scan interval, step 1423 and following initiation of a buffer lock, step 1425, confirms if all files have been scanned, step 1427. If all have been scanned, the buffer lock is released, step 1429 and the database storage steps are carried out, step 1431 as shown in FIG. 14*c*. During each scan, it then determines if the next file 1319_1 to 1319_3 is empty, step 1433. If it is not empty, it then determines if it has been updated since the last scan, step 1435. If not then there is no current activity on the file so the file should be written into the database and the file is flushed and closed, step 1437, to create a renamed temporary file 1317_1 to 1317_3, step 1439 and output to the file is unlocked. This means that file writing is not blocked during database update operations.

For database storage, step 1431, the temporary files 1317_1 to 14317_3 are read, step 1441 and for each read temporary file, it is bulk loaded into the database 323 via the interface 1313, steps 1443 and 1445, once all files have been read. Since the persistence mechanism uses metadata to define the database schema, buffers data to be persisted to disk, and bulk loads data into the database for efficiency.

Metadata driven event forwarding is also implemented using a subscriber, which subscribes to the distributed event bus 305 for the events to be forwarded, and a forwarder 307, which converts the events into a format that can be understood by the external system 309.

Other event processing components such as a component that analyses input events using machine learning techniques can be implemented in a similar manner to the correlator as described above with reference to FIGS. 10, 11*a*, 11*b* and 11*c*. Such a component subscribes to a set of events, processes those events, and publishes those events back onto the distributed event bus 305.

As a result, the handling of events is configured at run time without any source code development and system installation. A user wishing to introduce new events, specify correlations on those events that generate new events, and persist the raw and correlated events to a database, writes XML files that specifies the events to be parsed, correlated, and persisted. The system can immediately handle the new events, run the new correlations, and persist the events to the database.

In the event-driven communication system of FIG. 3, it may be configured to handle two types of correlations. For example, a Handover correlation which subscribes to the set of radio network, core network and probed protocol events that are required for handover correlations and generates Handover correlated events and a Bearer Session correlation which subscribes to the core network and probed protocol events that are required for bearer session correlation and generates Bearer Session correlated events. Details of these correlation types are described in detail below.

Bearer Session Correlation

The operator has the system of FIG. 3 installed on a device that is receiving core network events from MMEs and throughput events from protocol probes, for example. The operator wishes to implement bearer session correlation on the system. To carry out bearer session correlation, the following three events are used:

| ATTACH | TCP_USAGE | DETACH |
|---|---|---|
| IMSI (The IMSI is the International Mobile Subscriber Identity, or the mobile phone number of the subscriber) | Timestamp | IMSI |

-continued

| ATTACH | TCP_USAGE | DETACH |
|---|---|---|
| Timestamp UE IP Address | Duration UE IP Address UE Port Other IP Address Other Port Bytes Carried | Timestamp |

The ATTACH event is sent by the MME at the start of a user session, the DETACH event is sent at the end of a user session. The TCP probe generates a TCP_USAGE event periodically, for example every minute.

The operator wishes to implement two correlations: one correlation to create TCP_USAGE_TO_DATE event whenever a TCP_USAGE event is received from the probe, and another to create a TOTAL_TCP_USAGE event when the DETACH event is received.

The operator wishes to store the raw and correlated events to the database so that a client application that shows TCP usage can read the data and show it immediately in real time. The correlated events are below:

| TCP_USAGE_TO_DATE | TOTAL_TCP_USAGE |
|---|---|
| IMSI | IMSI |
| Timestamp | Timestamp |
| Duration | IMSI |
| UE IP Address | UE IP Address |
| UE Port | UE Port |
| Other IP Address | Other IP Address |
| Other Port | Other Port |
| Bytes Carried | Timestamp Start |
| Timestamp Start | Total Bytes Carried |
| Total Bytes Carried | |

The operator carries out the following steps to implement the correlations:

1. Write an XML file that specifies the ATTACH and DETACH events.
2. Write an XML file that specifies the TCP_USAGE event.
3. Write an XML file that specifies the TCP_USAGE_TO_DATE and TOTAL_TCP_USAGE correlated events.
4. Write a correlation with rules that matches the UE IP Address field from a TCP_USAGE event with the UE IP Address field from an ATTACH event, reads the IMSI and Timestamp from the ATTACH event, and creates a new TCP_USAGE_TO_DATE event with the fields from the TCP_USAGE and ATTACH events.
5. Write a correlation with rules that matches the IMSI from a DETACH event with the IMSI from ATTACH and TCP_USAGE_TO_DATE events and creates a new TOTAL_TCP_USAGE event.
6. Add the tables for the new events to the database by loading the XML files created in steps 1, 2, and 3 and running the algorithm described in FIGS. 12*a* and 12*b*.
7. Specify an Event Persister component that listens to the events specified in steps 1, 2, and 3 and persists them to the database using the method described in FIG. 13 and FIGS. 14*a*, 14*b* and 14*c*.
8. Specify an Event Correlator component for TCP_USAGE_TO_DATE that uses the XML file created in step 3 and the correlation rules created in step 4 that creates TCP_USAGE_TO_DATE events using the method described in FIG. 10 and FIGS. 11*a*, 11*b* and 11 c.

9. Specify an Event Correlator component for TOTAL_TCP_USAGE that uses the XML file created in step 3 and the correlation rules created in step 5 that creates TCP_USAGE_TO_DATE events using the method described in FIG. 10 and FIGS. 11a, 11b and 11c.
10. Specify an Event Parser component that parses the ATTACH and DETACH events specified in step 1 from MME core network event files and publishes them using the method described in FIGS. 2a and 2b.
11. Specify an Event Parser component that parses TCP_USAGE events specified in step 1 from event streams from TCP probes and publishes them using the method described in FIGS. 2a and 2b.
12. Activate the specified components on the device implementing the system.

The system now parses the input events, runs the correlations, and persists all the events to the database, all without any source code development.

Each MME in the network produces a core network event file for every reporting period. The core network event file parser reads the events from the file one by one. When it finds an ATTACH event or a DETACH event in the file as specified in the XML file written in Step 1 above, it creates an ATTACH Event object or a DETACH event object, and sends it to the Publisher component. The Publisher component publishes the ATTACH event object or DETACH event object on the distributed event bus.

The TCP probe is continuously sending data to the system as a stream. The TCP Event Parser reads the events from the probe as they come in on the event stream. When it finds a TCP_USAGE event on the stream as specified in the XML file written in Step 2 above, it creates a TCP_USAGE Event object and sends it to the publisher 315. The publisher 315 publishes the TCP_USAGE event object on the distributed event bus 305.

The correlator 313 written in Step 8 above listens for ATTACH Event objects and TCP_USAGE Event objects on the distributed event bus using its subscriber 311. When an ATTACH Event object is detected, the correlator 313 opens a new correlation. When a TCP_USAGE Event object is detected, the correlator 313 matches that with the ATTACH Event object that has the same UE IP Address and creates a TCP_USAGE_TO_DATE Event object. The correlator 313 then sends the TCP_USAGE_TO_DATE Event object to its publisher 315, which publishes the new TCP_USAGE_TO_DATE Event object on the distributed event bus 305.

The correlator 313 written in Step 9 above listens for ATTACH Event objects, DETACH Event Objects and TCP_USAGE Event objects on the distributed event bus 305 using its subscriber 311. When an ATTACH Event object is detected, the correlator 313 opens a new correlation and creates a TOTAL_TCP_USAGE Event object. When a TCP_USAGE Event object is detected, the correlator 313 matches that with the TOTAL_TCP_USAGE Event object that has the same UE IP Address and updates the data in the TOTAL_TCP_USAGE Event object. When an DETACH Event object is detected, the correlator 313 sends the TOTAL_TCP_USAGE Event object to its publisher 315, which publishes the new TOTAL_TCP_USAGE Event object on the distributed event bus 305.

All events are persisted in the case being described here. A database Persister listens for all Event objects specified in the XML files written in steps 1, 2, and 3 above using its subscriber, and stores those events to the database table created in step 6 above using its Database Mediator (not shown in the figures).

Handover Correlation

The operator has the system of FIG. 3 installed on a device that is receiving radio network events from eNodeB nodes, for example. The operator wishes to implement handover correlation on the system. To carry out handover correlation two events are used:

| HANDOVER_FROM | HANDOVER_TO |
| --- | --- |
| IMSI | IMSI |
| Timestamp | Timestamp |
| eNodeB Name | eNodeB Name |
| Cell ID | Cell ID |

The HANDOVER_FROM event is sent by the eNodeB that is handing the UE over. The HANDOVER_TO event is sent by the eNodeB that is receiving the UE.

The operator wishes to implement a correlation that shows the entire handover as a single event. A HANDOVER correlated event combines the events from the source and destination eNodeB into a single event. The operator wishes to just store the correlated event to the database. The correlated event is below:

| HANDOVER |
| --- |
| IMSI |
| Timestamp |
| Duration |
| Source eNodeB Name |
| Source Cell ID |
| Destination eNodeB Name |
| Destination Cell ID |

The operator carries out the following steps to implement the correlations:
1. Write an XML file that specifies the HANDOVER_FROM and HANDOVER_TO events.
2. Write an XML file that specifies the HANDOVER correlated event.
3. Write a correlation with rules that matches the IMSI fields from HANDOVER_ FROM and HANDOVER_TO events, reads the other fields from those events, and creates a new HAN DOVER event.
4. Add the table for the new HANDOVER event to the database by loading the XML files created in step 2 running the algorithm described in FIGS. 12a and 12b.
5. Specify an Event Persister component that listens for HANDOVER events specified in step 2 and persists them to the database using the method described in FIG. 13 and FIGS. 14a, 14b and 14c.
6. Specify an Event Correlator component for HANDOVER that uses the XML file created in step 2 and the correlation rules created in step 3 that creates TCP_HANDOVER_TO_DATE events using the method described in FIG. 10 and FIGS. 11a, 11b and 11c.
7. Specify an Event Parser component that parses the HANDOVER_FROM and HANDOVER _TO events specified in step 1 from eNodeB cell trace files and publishes them using the method described in FIGS. 2a and 2b.
8. Activate the specified components on the device implementing the system.

The system now parses the input events, runs the correlations, and persists all the events to the database, all without any source code development.

Each eNodeB in the network produces a radio network event file for every reporting period. The radio network event parser reads the events from the file one by one. When it finds a HANDOVER_FROM event or a HANDOVER_TO event in the file as specified in the XML file written in Step 1 above, it creates a HAN DOVER_FROM Event object or a HAN DOVER_TO event object, and sends it to the Publisher component. The Publisher component publishes the HAN DOVER_FROM event object or HANDOVER_TO event object on the distributed event bus.

The correlator written in Step 6 above listens for HANDOVER_FROM Event objects and HANDOVER_TO Event objects on the distributed event bus using its subscriber. When a HANDOVER FROM Event object is detected; the correlator opens a new correlation. When a HANDOVER_TO Event object is detected, the correlator matches that with the HANDOVER_FROM Event object that has the same IMSI and creates a HANDOVER Event object. The correlator then sends the HANDOVER Event object to its publisher, which publishes the new HANDOVER Event object on the distributed event bus.

Only HANDOVER events are persisted in the case being described here. A database Persister listens for HANDOVER Event objects specified in the XML files written in step 2 above using its Subscriber component, and stores those events to the database table created in step 4 above using its Database Mediator component.

The forwarder 307 listens for the HANDOVER event objects through its subscriber (not shown in FIG. 3), when the HANDOVER event objects arrive into the forwarder 307, it converts the HANDOVER event objects into a format that can be understood by the external system. After the completion of translation, the translated data will be forwarded to the external system.

In this example, events are persisted to two database types (not shown in FIG. 3). All events are persisted to a database so the subscriber of its persister subscribes to all events. Correlated events are persisted to another database, so the subscriber of its persister subscribes only to Handover and Bearer Session events.

All MME and all correlated events are forwarded to an analytics system 309 in this example. The subscriber of the event forwarder 307 subscribes to radio network, and core network Handover, and Bearer Session events and forwards them to the analytics system 309.

Each correlation is set up using a configuration file, typically defined in XML. A set of input events, a set of output events, and a set of correlation rules are defined for each correlation.

Although embodiments of the present invention have been illustrated in the accompanying drawings and described in the foregoing detailed description, it will be understood that the invention is not limited to the embodiments disclosed, but is capable of numerous modifications without departing from the scope of the invention as set out in the following claims.

The invention claimed is:

1. A method of determining an event instance in an event driven communications system, the method comprising the steps of:
   receiving an event stream, the event stream comprising a plurality of events;
   retrieving metadata and an event class name for each event of the received event stream;
   instantiating an event instance for each event of the received event stream based on the retrieved metadata and an event class name; and
   reading event data of each event of the received event stream into the instantiated event instance, wherein the step of retrieving metadata and an event class name for each event comprises the steps of:
      retrieving an identifier of each event of the received event stream;
      retrieving metadata from an event metadata library associated with the retrieved identifier of each event of the received event stream; and
      retrieving an event class name from an event class library associated with the retrieved identifier of each event of the received event stream.

2. A method according to claim 1, wherein the step of reading event data of the received event stream into the instantiated event instance comprises:
   reading event data of each event into an event base class associated with the retrieved event class name.

3. A method according to claim 1, wherein the event may comprise different versions of events, and the step of retrieving metadata and an event class name for each event of the received event stream further comprises:
   retrieving metadata and an event class name for each event of the received event stream for a version of event.

4. A method according to claim 1, wherein the method further comprises:
   maintaining an event metadata library by:
      loading all versions of event metadata)ML files for all event sources and correlations;
      extracting metadata from the event metadata XML files; and
      updating an event metadata library with the extracted metadata.

5. A method according to claim 4, wherein the method further comprises:
   generating event mappings comprising:
      selecting fields from a base event for the event being mapped, the base event comprising all fields of all versions of the event from a source; and
      generating the event mapping from the selected fields.

6. A method according to claim 5, wherein the method further comprises:
   generating a base class for each event from each event source and storing the base class in the event class library; and
   generating a sub class of the mapped event for every version of the event indicated by the metadata and storing the sub class in the event class library, associated with its corresponding base class.

7. A method according to claim 1, wherein the method further comprises:
   buffering each instantiated event instance; and
   publishing a plurality of the buffered instantiated event instances to a distributed event bus.

8. A method according to claim 7, wherein the method further comprises subscribing to and accessing event instances from the distributed bus.

9. A method according to claim 1, wherein the method further comprises storing instantiated event instances to a database management system.

10. A method according to claim 1, wherein the method further comprises forwarding event instances to external systems.

11. A method according to claim 1, wherein the method further comprises filtering a predetermined type of event from the received event stream prior to the step of retrieving.

12. A method of controlling event-driven communication between a plurality of nodes of a network, the method comprising the steps of:
    establishing a session for communication, the session being defined by a plurality of event instances, the event instances being determined by the steps of:
    receiving an event stream, the event stream comprising a plurality of events;
    retrieving metadata and an event class name for each event of the received event stream;
    instantiating an event instance for each event of the received event stream based on the retrieved metadata and event class name; and
    reading event data of each event of the received event stream into the instantiated event instance, wherein the step of reading event data of the received event stream into the instantiated event instance comprises:
    reading event data of each event into an event base class associated with the retrieved event class name.

13. A method of determining an event instance in an event driven communications system, the method comprising the steps of:
    receiving an event stream, the event stream comprising a plurality of events;
    retrieving metadata for each event of the received event stream;
    instantiating an event instance for each event of the received event stream based on the retrieved metadata;
    reading event data of each event of the received event stream into the instantiated event instance, and
    correlating at least two of the instantiated events by:
        creating correlation rules between the at least two instantiated event instances using the metadata associated with each instantiated event instance; and
        generating at least one correlated event instance from the at least two instantiated event instances by applying the created correlation rules.

14. An apparatus for determining an event instance in an event driven communications system, the apparatus comprising:
    a receiver configured to receive an event stream, the event stream comprising a plurality of events; and
    one or more processors configured to:
        retrieve metadata and an event class name from an event metadata library for each event of the received event stream;
        instantiate an event instance for each event of the received event stream based on the retrieved metadata;
        and read event data of each event of the received event stream into the instantiated event instance,
        wherein instantiating an event instance comprises instantiating an event instance for each event of the received event stream based on the retrieved metadata and event class name,
        wherein reading event data of the received event stream into the instantiated event instance comprises reading event data of each event into an event base class associated with the retrieved event class name.

15. An apparatus according to claim 14, wherein the receiver further comprises:
    a filter configured to filter a predetermined type of event from the event stream.

16. A communication control module for controlling event-driven communication between a plurality of nodes of a network, the module comprising:
    a session control module configured to establish a session for communication between a plurality of nodes, the session being defined by a plurality of event instances;
    a receiver configured to receive an event stream, the event stream comprising a plurality of events; and
    one or more processors configured to:
    retrieve metadata from an event metadata library for each event of the received event stream;
    to instantiate said plurality of event instance for each event of the received event stream based on the retrieved metadata; and
    read event data of each event of the received event stream into the instantiated event instance.

17. A communication control module according to claim 16, wherein said one or more processors are further configured to:
    correlate at least two of the instantiated events by:
        creating correlation rules between the at least two instantiated event instances using the metadata associated with each instantiated event instance; and
        generating at least one correlated event instance from the at least two instantiated event instances by applying the created correlation rules.

18. A communication control module according to claim 16, wherein said one or more processors are further configured to publish a plurality of the instantiated event instances to a distributed event bus.

19. A communication control module according to claim 18, wherein said one or more processors are further configured to subscribe to and access event instances from the distributed bus.

20. A communication control module according to claim 16, further comprising:
    a buffer configured to store a plurality of the instantiated event instances to a distributed event bus; and wherein the one or more processors are further configured to publish a buffered plurality of instantiated event instances.

21. A communication control module according to claim 16, wherein said one or more processors are further configured to store instantiated event instances to a database management system.

22. A communication control module according to claim 16, wherein said one or more processors are further configured to forward event instances to external systems.

* * * * *